(12) United States Patent
Brooks

(10) Patent No.: US 11,892,542 B1
(45) Date of Patent: *Feb. 6, 2024

(54) METHOD AND SYSTEM FOR DETERMINING SIGNAL DIRECTION

(71) Applicant: yoR Labs, Inc., Portland, OR (US)

(72) Inventor: Clark Brooks, Portland, OR (US)

(73) Assignee: YOR LABS, INC., Beaverton, OR (US)

( * ) Notice: Subject to any disclaimer, the term of this patent is extended or adjusted under 35 U.S.C. 154(b) by 70 days.

This patent is subject to a terminal disclaimer.

(21) Appl. No.: 17/651,695

(22) Filed: Feb. 18, 2022

Related U.S. Application Data

(63) Continuation of application No. 16/404,497, filed on May 6, 2019, now Pat. No. 11,255,964, which is a continuation of application No. 15/133,474, filed on Apr. 20, 2016, now abandoned.

(51) Int. Cl.
| | | |
|---|---|---|
| *G01S 15/00* | (2020.01) | |
| *G01S 15/89* | (2006.01) | |
| *G01S 13/89* | (2006.01) | |
| *G01S 7/52* | (2006.01) | |
| *G10K 11/34* | (2006.01) | |

(52) U.S. Cl.
CPC .......... *G01S 15/89* (2013.01); *G01S 7/52047* (2013.01); *G01S 13/89* (2013.01); *G01S 15/8927* (2013.01); *G10K 11/346* (2013.01)

(58) Field of Classification Search
USPC ........................................................ 367/103
See application file for complete search history.

(56) References Cited

U.S. PATENT DOCUMENTS

| | | |
|---|---|---|
| 4,998,132 A | 3/1991 | Kurogane |
| 5,617,371 A | 4/1997 | Williams |
| 5,903,516 A | 5/1999 | Greenleaf et al. |
| 5,908,389 A | 6/1999 | Roundhill et al. |
| 6,031,529 A | 2/2000 | Migos |
| 6,063,030 A | 5/2000 | Vara et al. |
| 6,120,450 A | 9/2000 | Li |
| 6,123,670 A | 9/2000 | Mo |
| 6,132,374 A | 10/2000 | Hossack et al. |

(Continued)

FOREIGN PATENT DOCUMENTS

| | | |
|---|---|---|
| AU | 2018250516 | 11/2018 |
| EP | 2 288 284 | 5/2016 |

(Continued)

OTHER PUBLICATIONS

Bradley, Aug. 2008, Retrospective transmit beamformation: Acuson SC2000 vol. imaging ultrasound system, Siemens Medical Solutions USA, Inc., whitepaper, 8 pp.

(Continued)

*Primary Examiner* — James R Hulka
(74) *Attorney, Agent, or Firm* — KNOBBE, MARTENS, OLSON & BEAR LLP

(57) ABSTRACT

Methods and systems for the efficient determination of the direction of multiple signal sources in both near and far field using hierarchical combinations of sets of raw input signals to convert spatial input to angular output. Each increasing hierarchical combination increases angular resolution, improving image quality with low computational expenditure.

18 Claims, 10 Drawing Sheets

(56) References Cited

U.S. PATENT DOCUMENTS

| | | |
|---|---|---|
| 6,400,981 B1 | 6/2002 | Govari |
| 6,607,489 B2 | 8/2003 | Hoctor |
| 6,690,963 B2 | 2/2004 | Ben Haim et al. |
| 6,908,434 B1 | 6/2005 | Jenkins et al. |
| 7,090,639 B2 | 8/2006 | Govari |
| 7,423,578 B1 | 9/2008 | Tietjen |
| 7,604,601 B2 | 10/2009 | Altmann et al. |
| 7,648,462 B2 | 1/2010 | Jenkins et al. |
| 7,667,639 B2 | 2/2010 | Cheng et al. |
| 7,682,358 B2 | 3/2010 | Gullickson et al. |
| 7,750,849 B2 | 7/2010 | Hjelmstad |
| 7,831,076 B2 | 11/2010 | Altmann et al. |
| 7,860,553 B2 | 12/2010 | Govari et al. |
| 7,918,793 B2 | 4/2011 | Altmann et al. |
| 7,996,060 B2 | 8/2011 | Trofimov et al. |
| 8,075,486 B2 | 12/2011 | Tal |
| 8,285,364 B2 | 10/2012 | Barbagli et al. |
| 8,390,438 B2 | 3/2013 | Olson et al. |
| 8,449,467 B2 | 5/2013 | Wilser et al. |
| 8,517,946 B2 | 8/2013 | Kim |
| 8,676,290 B2 | 3/2014 | Tegg |
| 8,690,871 B2 | 4/2014 | Partlett et al. |
| 8,702,612 B2 | 4/2014 | Hendriks et al. |
| 8,989,842 B2 | 3/2015 | Li et al. |
| 9,030,354 B2 | 5/2015 | Natarajan |
| 9,055,883 B2 | 6/2015 | Tgavalekos et al. |
| 9,095,682 B2 | 8/2015 | Romoscanu |
| 9,132,913 B1 | 9/2015 | Shapiro et al. |
| 9,179,890 B2 | 11/2015 | Ionasec et al. |
| 9,211,160 B2 | 12/2015 | Pivotto et al. |
| 9,261,595 B2 | 2/2016 | Garbini et al. |
| 9,323,445 B2 | 4/2016 | Kritt et al. |
| 9,342,156 B2 | 5/2016 | Huh |
| 9,922,554 B2 | 3/2018 | Mikuni et al. |
| 9,931,487 B2 | 4/2018 | Quinn et al. |
| 9,986,969 B2 | 6/2018 | Call et al. |
| 10,183,149 B2 | 1/2019 | Tegg et al. |
| 10,206,652 B2 | 2/2019 | Deno et al. |
| 10,368,951 B2 | 8/2019 | Moll et al. |
| 10,401,492 B2 | 9/2019 | Brooks |
| 10,405,830 B2 | 9/2019 | Garbini et al. |
| 10,463,439 B2 | 11/2019 | Joseph et al. |
| 10,499,882 B2 | 12/2019 | Hunter et al. |
| 10,537,307 B2 | 1/2020 | Yang |
| 10,555,780 B2 | 2/2020 | Tanner et al. |
| 10,624,612 B2 | 4/2020 | Sumi |
| 11,255,964 B2 | 2/2022 | Brooks |
| 11,344,281 B2 | 5/2022 | Morisse et al. |
| 11,547,386 B1 | 1/2023 | Roy et al. |
| 2002/0173721 A1 | 11/2002 | Grunwald |
| 2002/0173722 A1 | 11/2002 | Hoctor et al. |
| 2003/0007598 A1 | 1/2003 | Wang et al. |
| 2003/0055334 A1 | 3/2003 | Steinbacher et al. |
| 2003/0055337 A1 | 3/2003 | Lin |
| 2004/0102700 A1 | 5/2004 | Asafusa |
| 2005/0288588 A1 | 12/2005 | Weber et al. |
| 2007/0027733 A1 | 2/2007 | Balle |
| 2007/0174772 A1 | 7/2007 | Gorman |
| 2007/0200760 A1 | 8/2007 | Hjelmstad |
| 2007/0239001 A1 | 10/2007 | Mehi et al. |
| 2007/0259158 A1 | 11/2007 | Friedman et al. |
| 2008/0012753 A1 | 1/2008 | Cheng |
| 2008/0114239 A1 | 5/2008 | Randall et al. |
| 2008/0215046 A1 | 9/2008 | Messing et al. |
| 2008/0306385 A1 | 12/2008 | Jago |
| 2009/0043206 A1 | 2/2009 | Towfiq et al. |
| 2009/0118620 A1 | 5/2009 | Tgavalekos et al. |
| 2009/0271704 A1 | 10/2009 | Cohen |
| 2010/0030076 A1 | 2/2010 | Vortman et al. |
| 2010/0081938 A1 | 4/2010 | Kato |
| 2010/0146431 A1 | 6/2010 | Raji et al. |
| 2010/0160784 A1 | 6/2010 | Poland |
| 2010/0168580 A1 | 7/2010 | Thiele |
| 2010/0251823 A1 | 10/2010 | Adachi |
| 2011/0077524 A1 | 3/2011 | Oshiki et al. |
| 2011/0137132 A1 | 6/2011 | Gustafson |
| 2011/0208052 A1 | 8/2011 | Entrekin |
| 2012/0075208 A1 | 3/2012 | Tamiya et al. |
| 2012/0157851 A1 | 6/2012 | Zwirn |
| 2012/0254747 A1 | 10/2012 | Bocirnea |
| 2013/0227052 A1 | 8/2013 | Wenzel |
| 2013/0234891 A1 | 9/2013 | Natarajan et al. |
| 2013/0238990 A1 | 9/2013 | Ubillos et al. |
| 2013/0253317 A1 | 9/2013 | Gauthier |
| 2013/0274712 A1 | 10/2013 | Schecter et al. |
| 2014/0035916 A1 | 2/2014 | Murphy |
| 2014/0046188 A1 | 2/2014 | Yen et al. |
| 2014/0058266 A1 | 2/2014 | Call et al. |
| 2014/0087342 A1 | 3/2014 | Campanatti, Jr. |
| 2014/0164965 A1 | 6/2014 | Lee et al. |
| 2014/0189560 A1 | 7/2014 | Caspi |
| 2014/0219059 A1 | 8/2014 | Younghouse |
| 2015/0019488 A1 | 1/2015 | Higginson et al. |
| 2015/0065877 A1 | 3/2015 | Orderud |
| 2015/0082251 A1 | 3/2015 | Lam |
| 2015/0293223 A1 | 10/2015 | Park et al. |
| 2016/0054901 A1 | 2/2016 | Yang et al. |
| 2016/0157824 A1 | 6/2016 | Park et al. |
| 2016/0161589 A1 | 6/2016 | Benattar |
| 2016/0161594 A1 | 6/2016 | Benattar |
| 2016/0161595 A1 | 6/2016 | Benattar |
| 2016/0165338 A1 | 6/2016 | Benattar |
| 2016/0165341 A1 | 6/2016 | Benattar |
| 2016/0338676 A1 | 11/2016 | Berger et al. |
| 2017/0090571 A1 | 3/2017 | Bjaerum |
| 2017/0153801 A1 | 6/2017 | Kim et al. |
| 2017/0307755 A1 | 10/2017 | Brooks |
| 2017/0343655 A1 | 11/2017 | Solek et al. |
| 2017/0343668 A1 | 11/2017 | Brooks et al. |
| 2018/0000449 A1 | 1/2018 | Moore et al. |
| 2018/0000453 A1 | 1/2018 | Hunter et al. |
| 2018/0055483 A1 | 3/2018 | Hunter |
| 2018/0064415 A1 | 3/2018 | Zhai et al. |
| 2018/0361145 A1 | 12/2018 | Mahapatra et al. |
| 2019/0245310 A1 | 8/2019 | Medina et al. |
| 2019/0261953 A1 | 8/2019 | Honjo et al. |
| 2019/0307427 A1 | 10/2019 | Levy et al. |
| 2019/0324139 A1* | 10/2019 | Brooks ............. G01S 15/89 |
| 2019/0353975 A1 | 11/2019 | DiDomenico |
| 2020/0046321 A1 | 2/2020 | Duda |
| 2020/0060646 A1 | 2/2020 | Lindenroth et al. |
| 2020/0170662 A1 | 6/2020 | Vardi |
| 2020/0178928 A1 | 6/2020 | Park et al. |
| 2020/0183004 A1 | 6/2020 | Gong et al. |
| 2020/0205783 A1 | 7/2020 | Shiran |
| 2020/0268351 A1 | 8/2020 | Chiang |
| 2020/0281565 A1 | 9/2020 | Yee et al. |
| 2020/0315592 A1 | 10/2020 | Soleimani et al. |
| 2021/0007710 A1 | 1/2021 | Douglas |
| 2021/0038334 A1 | 2/2021 | Hsu et al. |
| 2021/0125503 A1 | 4/2021 | Henry et al. |
| 2021/0177379 A1 | 6/2021 | Kolen et al. |
| 2021/0338208 A1 | 11/2021 | Nguyen et al. |
| 2021/0401508 A1 | 12/2021 | Zhao |
| 2022/0061811 A1 | 3/2022 | Terleski |
| 2022/0061814 A1 | 3/2022 | Morisse |
| 2022/0151591 A1 | 5/2022 | Morisse |
| 2022/0156094 A1 | 5/2022 | Morisse |
| 2023/0059122 A1 | 2/2023 | Pellegrino |

FOREIGN PATENT DOCUMENTS

| | | |
|---|---|---|
| EP | 3 275 478 | 1/2018 |
| EP | 2 707 076 | 11/2018 |
| EP | 3 050 214 | 3/2019 |
| EP | 2 632 318 | 11/2019 |
| EP | 3 518 777 | 3/2021 |
| WO | WO 12/088535 | 6/2012 |
| WO | WO 20/049012 | 3/2020 |
| WO | WO 20/252416 | 12/2020 |

(56) References Cited

OTHER PUBLICATIONS

Lin et al., Jun. 2010, A motion compounding technique for speckle reduction in ultrasound images, Journal of digital imaging 23(3):246-257.

* cited by examiner

METHOD AND SYSTEM FOR DETERMINING SIGNAL DIRECTION

RELATED APPLICATIONS

This application is a continuation of U.S. patent application Ser. No. 16/404,497, filed May 6, 2019, which is a continuation of U.S. patent application Ser. No. 15/133,474, filed on Apr. 20, 2016. Each of these disclosures is incorporated by reference herein in its entirety.

BACKGROUND

Imaging technologies based on frequencies include technologies such as ultrasound, radar, sonar and radio astronomy. Ultrasound, radar and sonar technologies generally send a signal and determine a position and/or shape of an object by processing the reflections of the signals and use that reflection to create an image whereas radio astronomy processes signals assuming they are coming from far away.

While standard transducers comprise either a single active element that both generates and receives high frequency sound waves, or two paired elements, one for transmitting and one for receiving; phased arrays comprise transducer assemblies that can each be pulsed separately. The transducer assemblies may be arranged in a strip (linear array), a ring (annular array), a circular matrix (circular array), curved, or a more complex shape. A phased array system varies the time between a series of outgoing pulses in such a way that the individual wave fronts generated by each element in the array combine with each other to add or cancel energy in predictable ways that effectively steer and shape the sound beam or radio signal.

Beamforming is a signal processing technique used to precisely align the phases of an incoming signal from different parts of an array to form a well understood beam in a specific direction and focus depth. The signals from each of the elements are delayed such that when they are summed they all have the same delay corresponding to a specific direction. However, each independent beam requires an independent analog path or delay and sum calculation causing increasing complications and computational complexity as the size of the array and the corresponding number of independent beams increases.

There is therefore a need for alternative methods of signal processing to align the phases of an incoming signal to efficiently create images from phased arrays in imaging technology.

BRIEF SUMMARY

Described herein is a method of beamform signal processing to enhance image quality and angular resolution from signals received from a phased array in near and far field imaging data and to transform raw transducer data into a form that can be displayed on a screen with a high degree of image resolution. The methods and systems described herein may take a single or multi-dimensional image generated from a transducer array and generate multi-dimensional images one dimension more than the dimension from which the image was generated, e.g. 2D images may be generated from 1D images, 3D images may be generated from 2D images, et cetera. The signal processing systems and methods described herein may be applied to radar, sonar, ultrasound and radio astronomy.

In the methods and systems and methods described here, translations are made from spatial input data to angular output. Two or more raw input signals are combined to form a similar number of output signals in a series of sub arrays across an array of input sensors/transducers less than a wavelength apart. In some embodiments, such transducers may be about 0.7 wavelengths apart or any fraction >1 wavelength.

In some embodiments, a first group of raw input signals from a first set of neighboring transducers in a phased array is combined to form a first set of output angular signals and a second group of raw input signals from a second set of neighboring sensors in the phased array is combined to form a second set of output angular signals. Two or more raw input signals may be combined to form a set of output angular signals until the spatial input form the entire sensor array has been converted to angular information of resolution at the Abbe limit. Each set of output angular signals of input is then combined with adjacent angular beams from neighboring subarrays to refine the angular resolution with the amount of angular resolution increasing with each subsequent pairing such that a fourth set in the hierarchy would have twice as much angular resolution as the second set in the hierarchy. The output angular signals may be combined in the same or different ways to refine angular resolution and improve image quality data. For example, inputs can be combined in any desired adjacent fashion including, but not limited to, up, down, azimuthal angle 8, and polar angle cp. In some embodiments, additional refinements to the data may be added such that some or all of the data including, but not limited to, the raw data, may be apodized.

The sample frequency used to generate the raw input signals in the methods and compositions described herein is at least two times per wavelength or period (T). In some embodiments, the sampling frequency may be about 10 times per wavelength, or any fraction in between including, but not limited to, 3, 4, 5, 6, 6.25, 7, 7.5, 8, 9, and the like. The same or different sample frequencies may be used to generate each group of raw input frequencies, creating a frequency agnostic system. In some embodiments, the beam directions may be determined in parallel.

In some embodiments, a method of generating a multi-dimensional image from a phase array with one less dimension than the multi-dimensional image may include receiving a signal of amplitude (A) from an array of sensors over time (t); apodizing received raw signals A; pairing each signal A received by a sensor with an adjacent signal above, below and across forming a first set of paired signals B; compensating for the time delay due to the location difference of each sensor receiving the signal; pairing each pair in the first set of paired signals B in accordance with their spatial placement and angle in volume in the phase array to form a second set of paired signals C; and/or pairing each pair in the second set of paired signals C in accordance with their spatial placement and angle in volume in the phase array to form a third set of paired signals D. Such third sets of paired signals D and/or subsequently grouped signals may be used to produce the multi-dimensional image.

In some embodiments, a beamforming apparatus may include a phased array and a processor configured to translate spatial input data from beam signals of angles between +π/4 radians to −π/4 radians to angular output by apodizing each set of signals, interpolating the angular information, and forming an image from the interpolated angular information. The phased array may include transducers separated by a distance L=λ/1.44 configured to receive signals of a frequency (f) with a period (T) and a time delay of +t/4 to −t/4 between signals received by adjacent transducers. In some embodiments, raw input data is paired according to space and time to create a first set of paired received signals. The first set of received signals is grouped according to space and time to create a second set of paired signals. In further embodiments, each of the second set of paired signals is grouped according to space, angle and time to create a third set of paired signals. In additional embodiments, each of the third set of paired signals is paired according to space, angle and time to create a fourth set of paired signals. Such grouping may continue hierarchically to combine angles of interest with adjacent angular beams from neighboring sub-arrays to refine angular resolution until all of the spatial input has been converted to angular information of resolution at the Abbe limit and used to generate images from phased arrays.

To the accomplishment of the foregoing and related ends, certain illustrative aspects of the system are described herein in connection with the following description and the attached drawings. The features, functions and advantages that have been discussed can be achieved independently in various embodiments of the present disclosure or may be combined in yet other embodiments, further details of which can be seen with reference to the following description and drawings. This summary is provided to introduce a selection of concepts in a simplified form that are elaborated upon in the Detailed Description. This summary is not intended to identify key features or essential features of any subject matter described herein.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
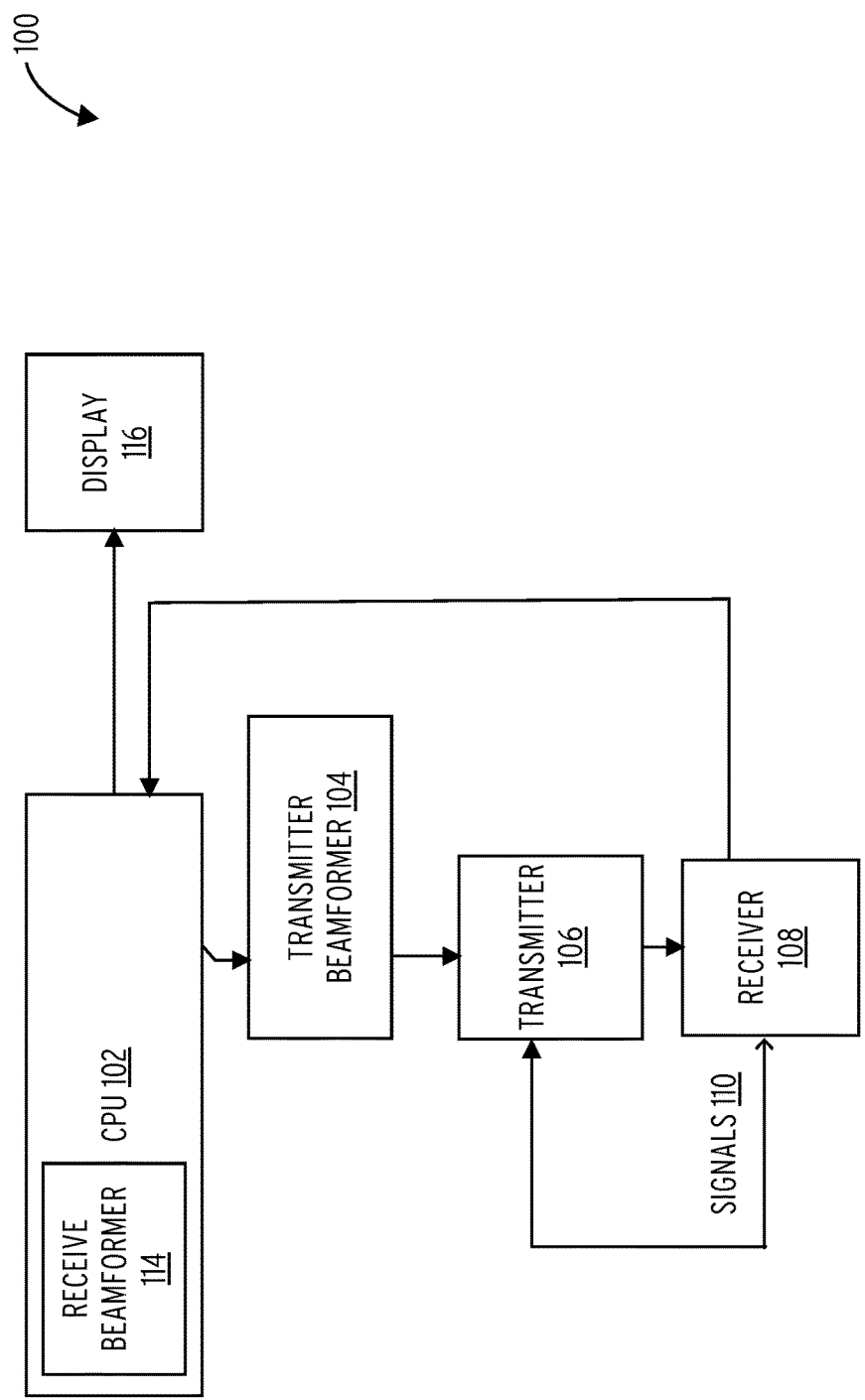
FIG. 1 illustrates an embodiment of processing of raw input received from a phased array with a beamforming apparatus as described herein.

"Abbe diffraction limit" in this context refers to that light with wavelength $\lambda$, traveling in a medium with refractive index n and converging to a spot with angle\theta will make a spot with radius $$d = \frac{\lambda}{2n \sin\theta}.$$

"Anistrophic" in this context refers to exhibiting properties with different values when measured in different directions.

"Apodization" in this context refers to the process of altering a signal (such as one emitted by an electrical sensor) to make its mathematical description smoother and more easily manipulatable.

"Far Field" in this context refers to the region from the antenna where the radiation pattern does not change shape with distance. It satisfies the following three equations: $R>(2D^2)/\lambda$, $R>>D$, and $R>>\lambda$.

"FLOPS" in this context refers to floating-point operations per second where "floating-point" is a method of encoding real numbers within the limits of finite precision available on computers.

"Fresnel zone" in this context refers to is a series of concentric ellipsoidal regions of alternating double strength and half strength volumes of a wave's propagation, caused by a wave following multiple paths as it passes by an object and is partially refracted by it, resulting in constructive and destructive interference as the different length paths go in and out of phase.

"Near Field" in this context refers to the area in the immediate vicinity of an antenna having a boundary of $R<0.62\sqrt{(D^3/\lambda)}$ where D is the maximum linear dimension of an antenna and $\lambda$, is the wavelength.

"Nyquist limit" in this context refers to the minimum sampling rate required to avoid aliasing. Specifically, there must be at least two samples per period of the wave being observed.

"Piezoelectric" in this context refers to the ability of certain materials to generate an AC (alternating current) voltage when subjected to mechanical stress or vibration, or to vibrate when subjected to an AC voltage, or both.

"Secant of an angle" in this context refers to the length of the hypotenuse divided by the length of the adjacent side. The abbreviation is sec. sec $\theta$=hypotenuse/adjacent. It is equal to 1/cosine.

"Voxel" in this context refers to each of an array of elements of volume that constitute a notional three-dimensional space, especially each of an array of discrete elements into which a representation of a three-dimensional object is divided.

DESCRIPTION

Described herein are methods and systems for translating spatial input data to angular output for a phased array in order to generate images with high resolution. Phased arrays may be in any shape desired including, but not limited to, linear, curved, annular, rectangular, circular, matrix, and the like. The methods and systems described herein decrease computational costs, allowing for increasingly complex phased arrays to be used in imaging technologies with near or far field focus including, but not limited to, ultrasound, radar, sonar and radio astronomy. In some embodiments, the system can produce images of high resolution and frame rate as well as handle high numbers of array elements.

During pulse propagation in a phased array, echoes are scattered by acoustic impedance perturbations and detected by the array elements. The data is sampled at a rate of about four to about ten of the fundamental frequency (f) though any fraction of that frequency can be used including but not limited to, 5, 6, 7, 8, and 9 or any fraction thereof, and digitally integrated through beamforming, allowing reception in a predefined direction corresponding to the transmission angle, and optimal focus at each depth.

In some embodiments, raw input signals received by a transducer in a phased array are combined hierarchically using spacial, angular and time coordinates using Cartesian coordinates, i.e. the placement of the input signal in space, the angle in volume, i.e. the direction facing into the void, and time delay, i.e. the difference in time for a beam to return based on the position of a transducer. The number of signals combined at each level in the hierarchy may vary from about 2 to about the square root of the total sensor/transducer count. In some embodiments, the translation of the input data from a plurality of raw input signals may take place using parallel processing.

As shown in the phased array with beamforming apparatus in FIG. 1, a CPU 102 sends instructions to a transmitter beamformer 104 that a signal should be sent from the transmitter 106. The transmitter 106 emits or instructs a transducer (not shown) to emit a series of pulsed signals 110 the series of the pulsed signals 110 are captured by a receiver 108 which may be the same or a different transducer than the transmitter 106. In some embodiments the transmitter 106 and the receiver 108 are the transducers or sensors. They may be the same or different transducers located in a phased array or in a probe. The echo received by the receiver 108 is then sent to the CPU 102 for receive beamformer 114. The CPU 102 may process the received data in real-time during a scanning/signal capture event or after a delay. Processed frames of data are presented on a display 116. In some embodiments, the CPU 102, transmitter beamformer 104, transmitter 106, and receiver 108, may all be contained in a probe. In other embodiments, they may be in one or more different wireless and/or wired devices.

Figure 2:
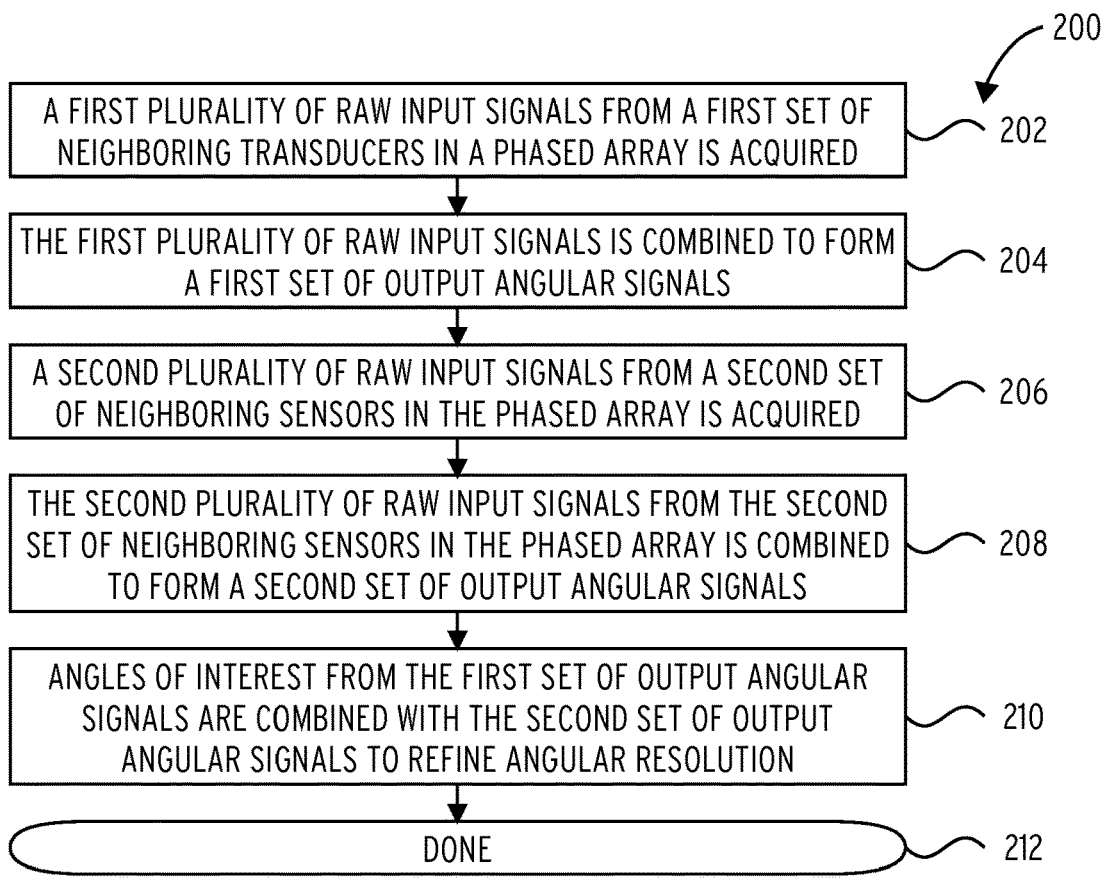
FIG. 2 illustrates a routine for interpreting beam direction imaging data in accordance with one embodiment.

Receive beamformer 114 may proceed as shown in FIG. 2, where a first plurality of raw input signals from a first set of neighboring transducers in a phased array is acquired 202. Once the signals are acquired, the first plurality of raw input signals is combined to form a first set of output angular signals 204. A second plurality of raw input signals from a second set of neighboring sensors in the phased array is acquired 206 and the second plurality of raw input signals from the second set of neighboring sensors in the phased array is combined to form a second set of output angular signals 208. Angles of interest from the first set of output angular signals are combined with the second set of output angular signals to refine angular resolution 210, continuing until the spatial input from the entire sensor array has been converted to angular information of resolution at the Abbe limit at which point Routine 200 ends 212. The angles of interest may be combined in a plurality of independent ways to refine angular resolution including up, down, at an azimuthal angle θ and polar angle φ and the like.

Figure 3:
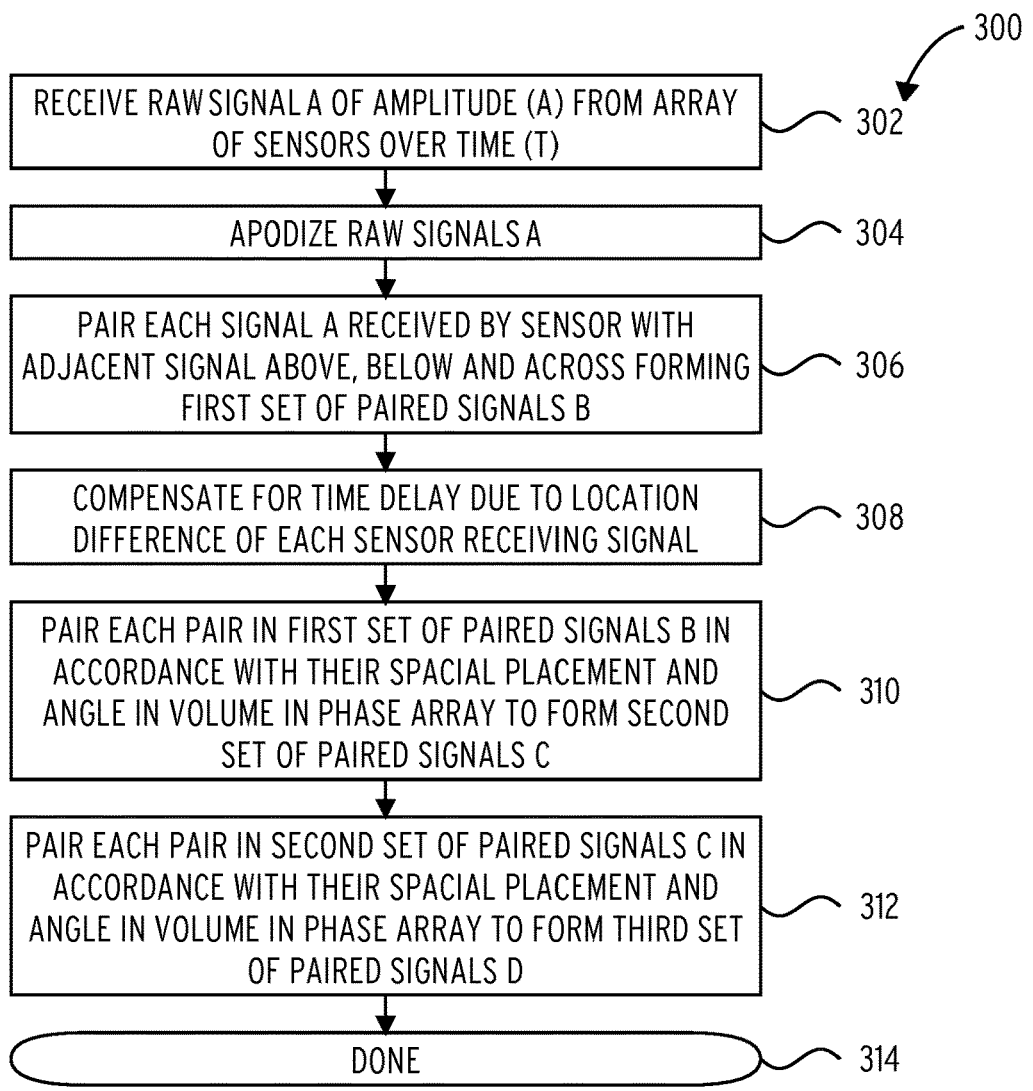
FIG. 3 illustrates a routine for increasing the angular resolution of raw input.

In additional embodiments, receive beamformer 114 may proceed as shown in FIG. 3, where Routine 300 receives raw signals A of amplitude (A) from array of sensors over time (t) at 302. The raw signals A are apodized at 304. Each signal A received by a sensor is paired with an adjacent signal above, below and across forming a first set of paired signals B at 306 and compensating for the time delay due to the location difference of each sensor receiving a raw signal at 308. Each pair in the first set of paired signals B are grouped in accordance with their special placement and angle in volume in the phase array to form a second set of paired signals Cat 310. Each of the second set of signals C is grouped according to their spatial placement and angle in volume in the phase array to form a third set of paired signals D at 312. Angles of interest from the first set of output angular signals are combined with the second set of output angular signals to refine angular resolution, continuing until the spatial input from the entire sensor array has been converted to angular information of resolution at the Abbe limit at which point Routine 300 ends 314. The angles of interest may be combined in a plurality of independent ways to refine angular resolution including up, down, at an azimuthal angle θ and polar angle φ and the like.

Figure 4:
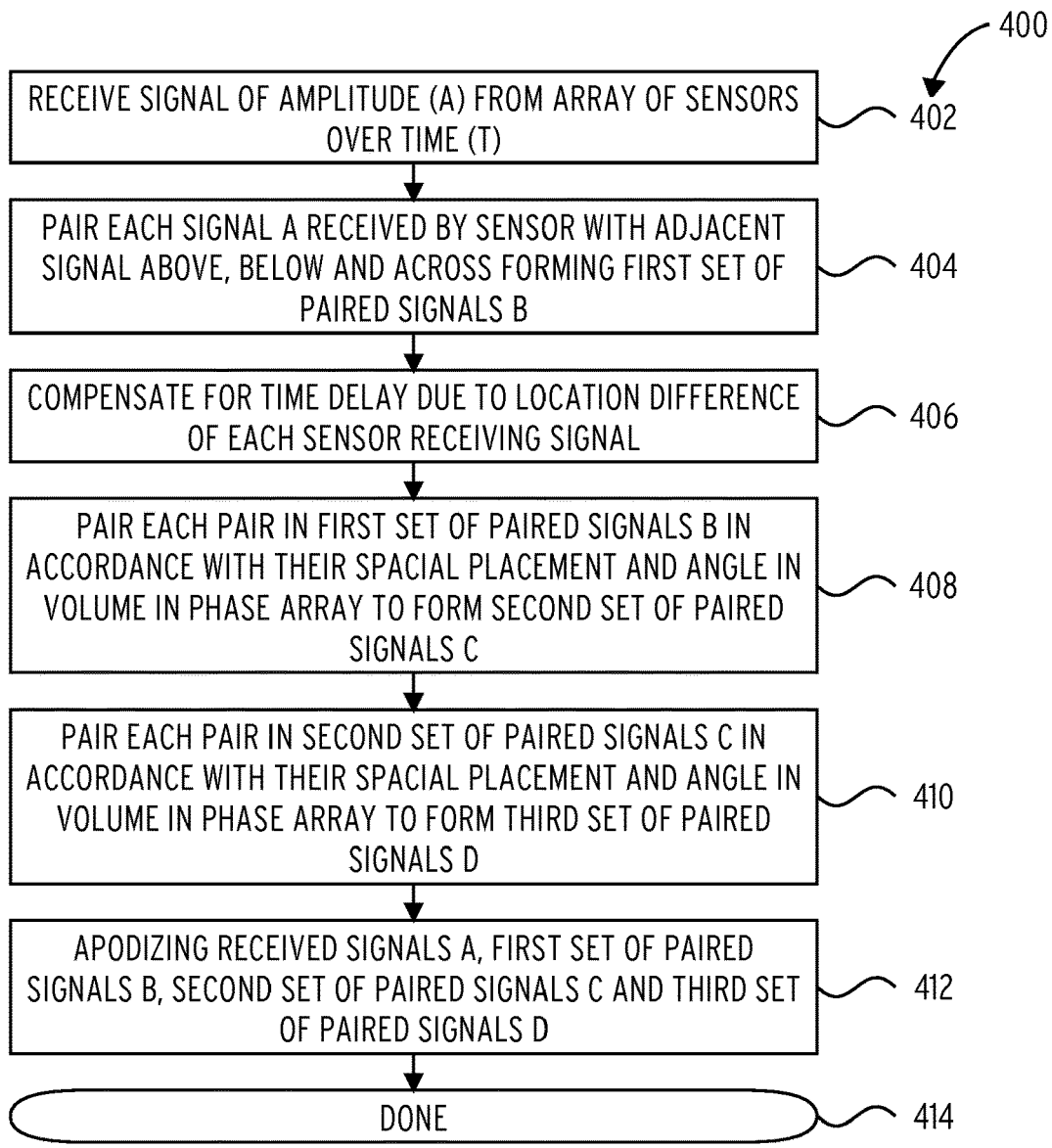
FIG. 4 illustrates a method of generating a multi-dimensional image from a phase array with one less dimension than the multi-dimensional image.

Signal pairing or grouping occurs in a hierarchical manner using spacial and angular coordinates from the phased array as well as time displacement based on the location of the transducers in relation to one another. As shown in FIG. 4, routine 400 receives a signal of amplitude (A) from an array of sensors over time (t) at 402. Routine 400 then pairs each signal A received by a sensor with an adjacent signal above, below and across forming a first set of paired signals B. Time delays in the signals due to difference in location of the sensors receiving the signal is compensated for at 406. Routine 400 then pairs each pair in the first set of paired signals B in accordance with their spacial placement and angle in volume in the phase array to form a second set of paired signals C at 408. Paired signals C are then paired in accordance with their spacial placement and angle in volume in the phase array to form a third set of paired signals D at 410. The pairing continues until the spacial input from the entire sensor array has been converted to angular information of resolution at the Abbe limit. In some embodiments, the raw input and the paired signals may be apodized. The angular information is then interpolated to form an image that may be displayed.

Figure 5:
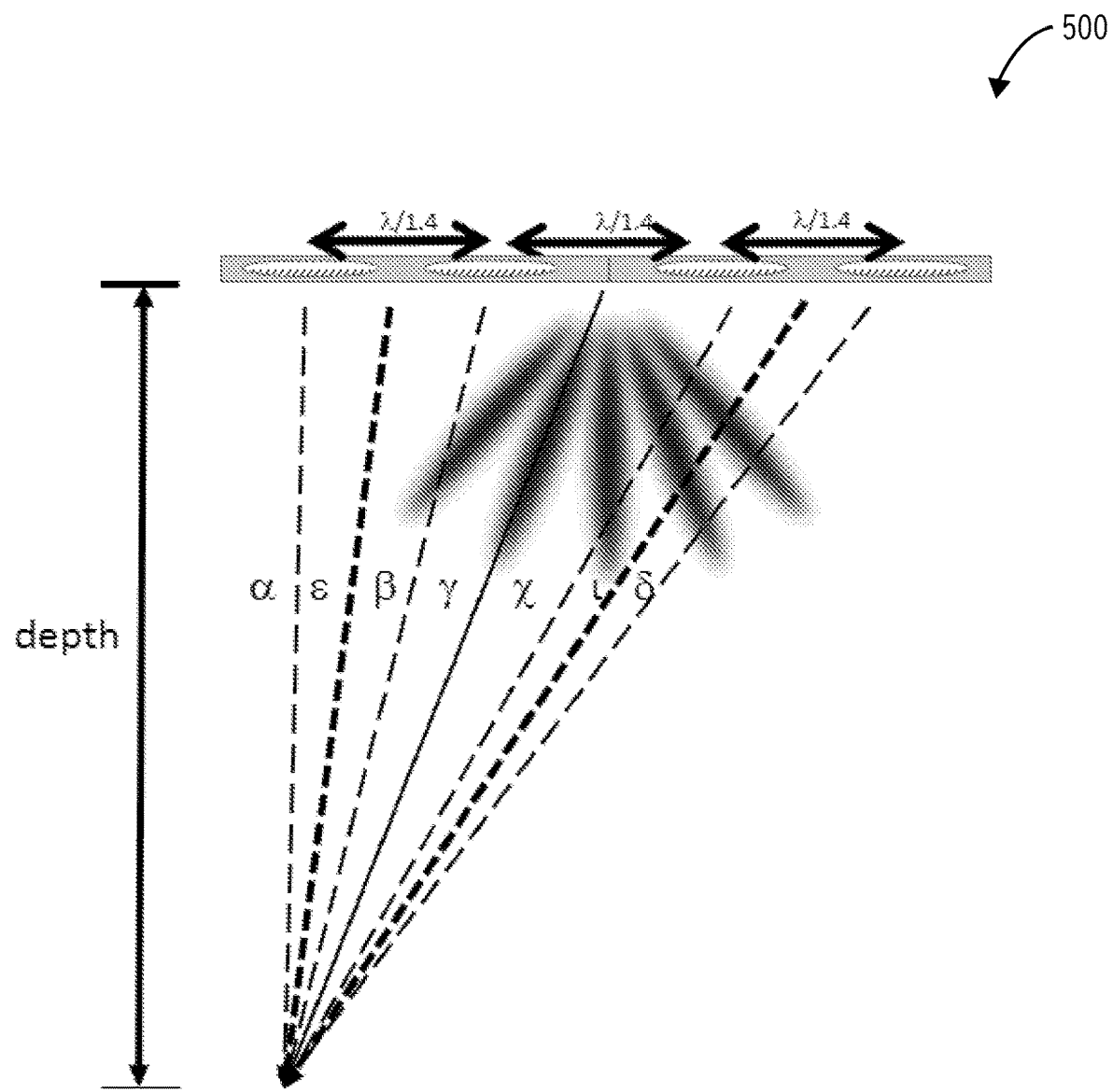
FIG. 5 illustrates the focal point for a single point in the near field.

In a phased array, sensors/transducers are separated by a constant distance L. As shown in FIG. 5, L separating exemplary sensors or transducers is a distance of $\lambda/1.4$ where $\lambda$ is the wavelength though any distance less than a wavelength $\lambda$ may be used and the beam angle is $+\pi/4$ radians to $-\pi/4$ radians. In the near field, each signal approaches a focal point at a different angle arriving at a different time point (t). The first layer of signals, $\alpha, \beta, \chi,$ and $\delta$ have no focal depth. The second layer of signal output, $\varepsilon$, $\iota$ and $\gamma$ is centered on pairs of transducers and the third layer of signal output $\delta$ is centered in four transducers. Exemplary distance/delay can be summarized as follows:

$\alpha$: depth
$\beta$: depth/cos(arctan(lambda/1.4*depth))
$\beta$: sqrt(depth^2+L^2/2)
$\chi$: sqrt(depth^2+2*L^2)
$\delta$: sqrt(depth^2+2*L^2)
$\varepsilon$: sqrt(depth^2+L^2/8)
$\iota$: sqrt(depth^2+12.5*L^2)
$\gamma$: sqrt(depth^2+4.5*L^2)

Figure 6:
FIG. 6 illustrates an hierarchical pairing of received signals A, with increased angular resolution with each subsequent pairing B and C; a 2D transducer array generating 3D images.
Figure 7:
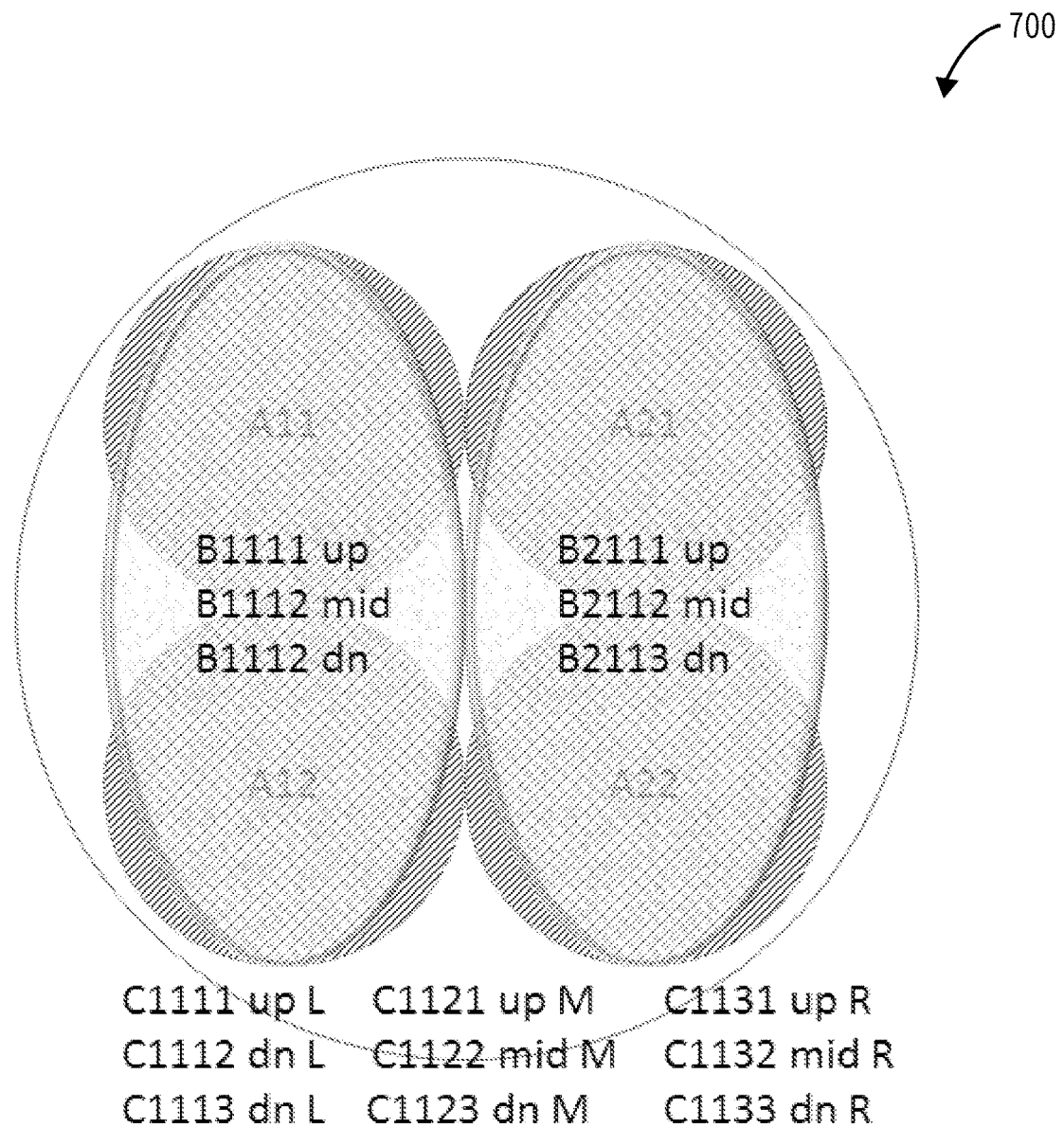
FIG. 7 illustrates a an alternative means of combining spatial input to obtain angular information where each A has location at a single direction and each C has the center location but diverse directions.

As shown in FIG. 6 and FIG. 7, in an array subtile, raw input signals A are paired hierarchically to form a first set of paired received signals B pairs which are then paired to form a second set of signals C.

As shown in FIG. 6, raw input A11 and A12 are combined with a time compensation t according to Aij[t]=raw inputs amplitudes to yield an equation Bijkm(t)=Yi [2j−1]*Ai[2j−1](t+{2m−3})+Yi[2j]*Ai[2j](t−{2m−3}) such that:

$A12(t+1)+A11(t-1)$ to yield $B$ in an upwards direction ($B$ up)

$A12(t-1)+A11(t+1)$ to yield $B$ in an downwards direction ($B$ down)

where $X_{ij}$, $Y_{ij}$ are constant tables derived from the windowing function for the full aperture such that X and Y are apodizing functions such as, but not limited to, $\exp-(x^2+y^2)$, where x and y are distances from the center of the sensor array; i and j represent coordinates in space (Cartesian) and k and m represent angular location where k corresponds to azimuthal angle θ and m represents polar angle φ. Inputs can be combined in any desired adjacent fashion including up, down, azimuthal angle θ and polar angle φ.

This first set of paired received signals B is then combined as shown in FIG. 6 with a time compensation to form a second plurality of paired signals of C pairs according to the formula:

$$C_{ijkm}(t)=X[2i-m]j*Bi[2j-m](t+\{2m-3\})+X[2i]j*Bi[2j](t-\{2m-3\})$$

where $X_{ij}$, $Y_{ij}$ are constant tables derived from the windowing function for the full aperture such that X and Y are apodizing functions, i and j represent coordinates in space (Cartesian) and where k corresponds to azimuthal angle θ and m represents polar angle φ. Inputs can be combined in any desired adjacent fashion including up, down, azimuthal angle θ and polar angle φ.

The first set of paired signals B is combined to form:

$$C,\text{up,left},(t)=B11\text{ up}(t-1)+B12\text{ up}(t+1)$$

$$C,\text{up,right},(t)=B11\text{ up}(t)+B12\text{ up}(t-1)$$

$$C,\text{down,left},(t)=B11\text{ down}(t-1)+B12\text{ down}(t+1)$$

$$C,\text{down,right},(t)=B11\text{ down}(t)+B12\text{ down}(t-1)$$

where the first two indices in the array, in this instance, "11", identify the location of the subarray in the sensor array, e.g. the first index counts from left to right and the second index counts from the top to the bottom of the array. In addition to the location of the sub array in the sensor array, the second set of paired signals such as adds the polar angles of a beam associated with the subarray. As the $A_{ij}$ array in most embodiments has no angle associated it with it, just two indices are listed. The pairing process continues until the spatial input from the entire sensor array has been converted to angular information of resolution at the Abbe limit. While these exemplary calculations demonstrate pairwise combinations of signals, the number of signals combined at each hierarchy in each subarray could vary from two to the square root of the total sensor count. For example, a third set of third set of paired signals D could be calculated according to the formula:

$$D_{ijkm}(t)=D_{ijkm}(t)=Yi[2j-m]*Ci[2j-m]k[m/2](t+\{2m-3\})+Yi[2j]Ci[2j]k[m/2](t-\{2m-3\}).$$

with D having twice as much angular resolution as when the raw input data was paired to form the first set of paired signals B, where $X_{ij}$, $Y_{ij}$ are constant tables derived from the windowing function for the full aperture such that X and Y are apodizing functions, i and j represent coordinates in space (Cartesian) and where k corresponds to azimuthal angle θ and m represents polar angle φ. Inputs can be combined in any desired adjacent fashion including up, down, azimuthal angle θ and polar angle φ.

In an alternative embodiment as shown in FIG. 7, each A may have a location in but a single direction and each C has the center location but diverse directions such that:

$$A_{ij}(t)=\text{raw inputs amplitudes}$$

$$B_{ijkm}(t)=Ai[2j-m](t+\{2m-4\})+Ai[2j](t-\{2m-4\})$$

$$C_{ijkm}(t)=B[2i-m]j[k/2]m(t+\{2k-4\})+B[2i]j[k/2]m(t-\{2k-4\})$$

where:
i: space index left/right
j: space index up/down
k: angle index left/right
m: angle index up/down such that:

$$A12(t+1)+A11(t-1) \text{ to yield } B \text{ in an upwards direction } (B \text{ up})$$

$$A12(t)+A11(t) \text{ to yield } B \text{ at an azimuthal angle } (B\theta)$$

$$A12(t-1)+A11(t+1) \text{ to yield } B \text{ in a downwards direction } (B \text{ down})$$

and $$C,\text{up,left},(t)=B11\text{up}(t-1)+B12\text{up}(t+1)$$

$$C,\text{up},\theta,(t)=B11\text{up}(t)+B12\text{up}$$

$$C,\text{up,right},(t)=B11\text{up}(t)+B12\text{up}(t-1)$$

$$C,\text{down,left},(t)=B11\text{down}(t-1)+B12\text{down}(t+1)$$

$$C,\text{down},\theta,(t)=B11\text{down}(t)+B12\text{down}$$

$$C,\text{down,right},(t)=B11\text{down}(t)+B(12)\text{down}(t-1)$$

with the pairing process continuing until the spatial input from the entire sensor array has been converted to angular information of resolution at the Abbe limit. While these exemplary calculations demonstrate pairwise combinations of signals, the number of signals combined at each hierarchy in each sub array could vary from two to the square root of the total sensor count.

The direction of a signal in a phased array may be detected by selectively delaying the signals received from each sensor and running cross-correlations of the received return signals. While this is feasible for phased arrays with small number of sensors, the computational cost for a larger array is the square of the number of sensors in the array. By hierarchically ranking pairs of sensors in space, angle, and accounting for time, the computational cost is the number of sensors times the log of the number of sensors rather than the square, decreasing the computational cost considerably. As shown in Table 1, even 512×512 inputs and outputs calculated according to the methods described herein can be calculated four orders of magnitude more efficiently than traditional methods as shown in lines 1-5 (delay and sum (4.12E+04) to 1.61E+02) of Table 1.

TABLE 1

| case | input nxm | output nxm | window | time interpolation | make 1 beam | sum over beams | sum layer: FLOPS/frame | GFLOPS at 100 fps |
|---|---|---|---|---|---|---|---|---|
| delay and sum | 262144 | 262144 | 262144 | 786432 | 524288 | 4.12E+11 | 4.12E+11 | 412E+04 |
| one of two | 512 | 512 | 512 | 1536 | 1024 | 1572864 | 8.05E+08 | |

TABLE 1-continued

| case | input nxm | output nxm | window | time interpolation | make 1 beam | sum over beams | sum layer: FLOPS/frame | GFLOPS at 100 fps |
|---|---|---|---|---|---|---|---|---|
| two of two | 512 | 262144 | 512 | 1536 | 1024 | 805306368 | 8.05E+08 | |
| | | | | | | | 1.61E+09 | 1.61E+02 |
| one of four | 32 | 32 | 32 | 96 | 64 | 6144 | 1.01E+08 | |
| two of four | 16 | 512 | 16 | 48 | 32 | 49152 | 2.52E+07 | |
| three of four | 32 | 16384 | 32 | 96 | 64 | 3145728 | 1.01E+08 | |
| four of four | 16 | 262144 | 16 | 48 | 32 | 25165824 | 2.52E+07 | |
| | | | | | | | 2.52E+08 | 2.52E+01 |
| one of nine | 4 | 4 | 4 | 12 | 8 | 96 | 6.29E+05 | |
| two of nine | 4 | 16 | 4 | 12 | 8 | 384 | 6.29E+06 | |
| three of nine | 4 | 64 | 4 | 12 | 8 | 1536 | 6.29E+06 | |
| four of nine | 4 | 256 | 4 | 12 | 8 | 6144 | 6.29E+06 | |
| five of nine | 4 | 1024 | 4 | 12 | 8 | 24576 | 6.29E+06 | |
| six of nine | 4 | 4096 | 4 | 12 | 8 | 98304 | 2.52E+07 | |
| seven of nine | 4 | 16384 | 4 | 12 | 8 | 393216 | 6.29E+06 | |
| eight of nine | 4 | 65536 | 4 | 12 | 8 | 1572864 | 6.29E+06 | |
| nine of nine | 4 | 262144 | 4 | 12 | 8 | 6291456 | 5.29E+06 | |
| max depth for 512 × 512 | | | | | | | 7.55E+07 | 7.55E+00 |

Computational Cost of Beamforming

Figure 8:
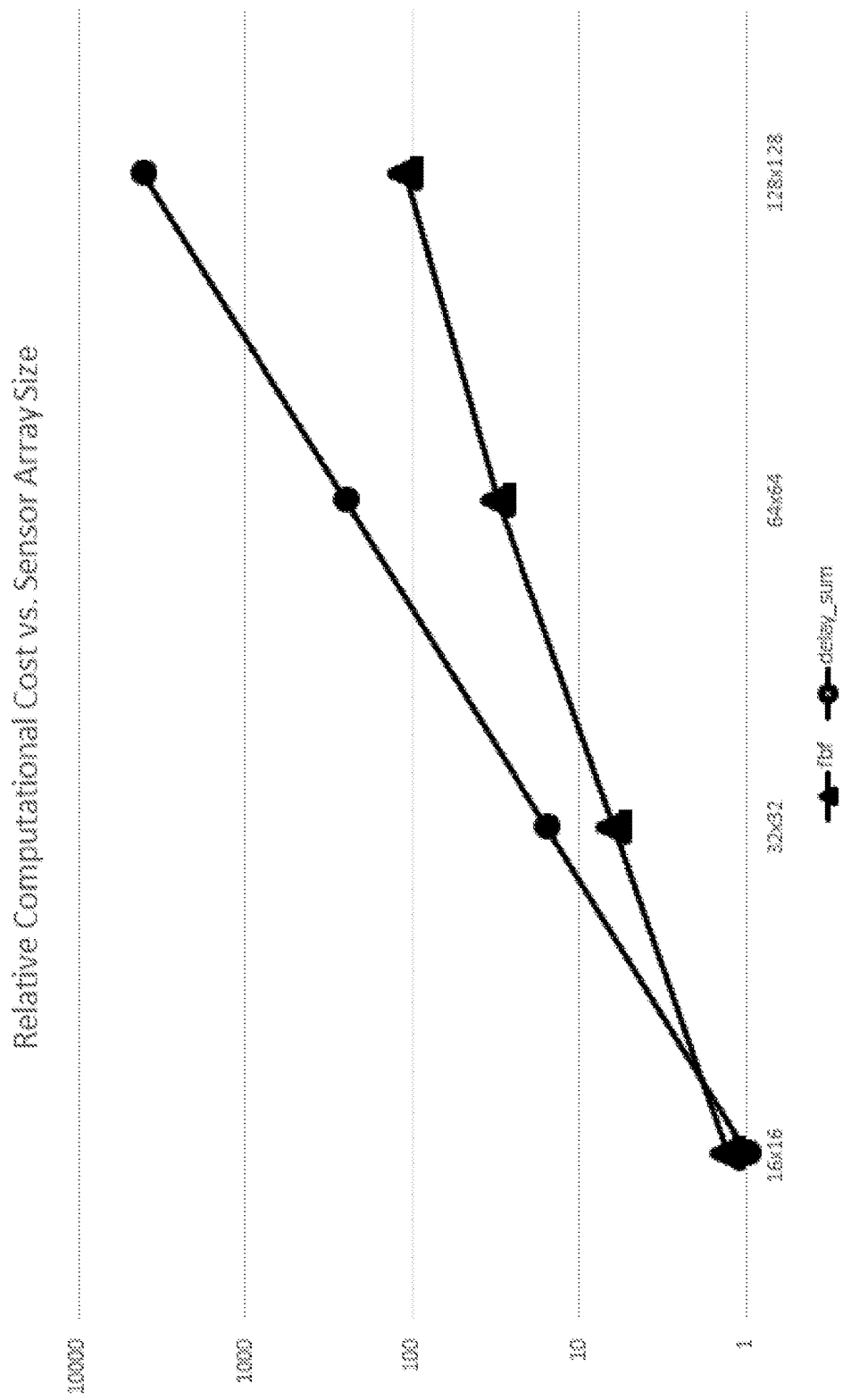
FIG. 8 is a graph showing the increased efficiency (logarithmic) of an embodiment described herein (fbf) in comparison to the current standard (delay_sum).
Figure 9:
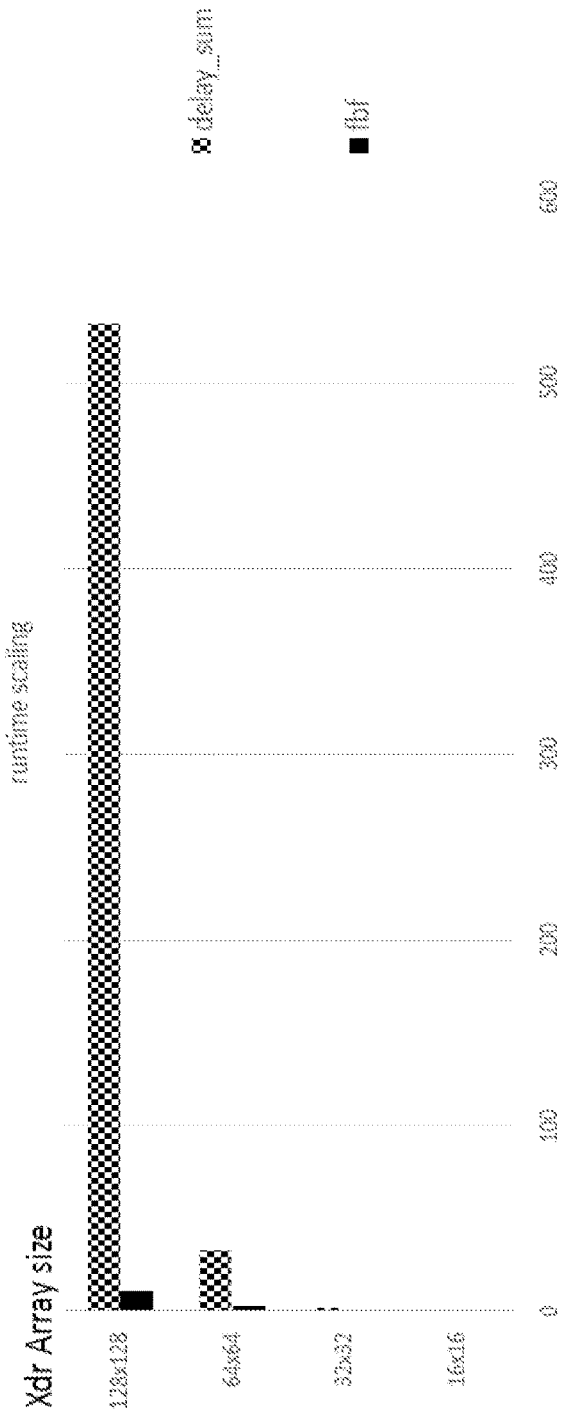
FIG. 9 is a chart illustrating a graph showing the increased efficiency of an embodiment described herein (fbf) in comparison to the current standard (delay_sum).

This is additionally shown in FIG. 8 and FIG. 9, as the number of sensors in the array increase, the processing delay (FIG. 8) and runtime of traditional methods increases significantly in proportion to the methods described herein (FIG. 9).

Figure 10:
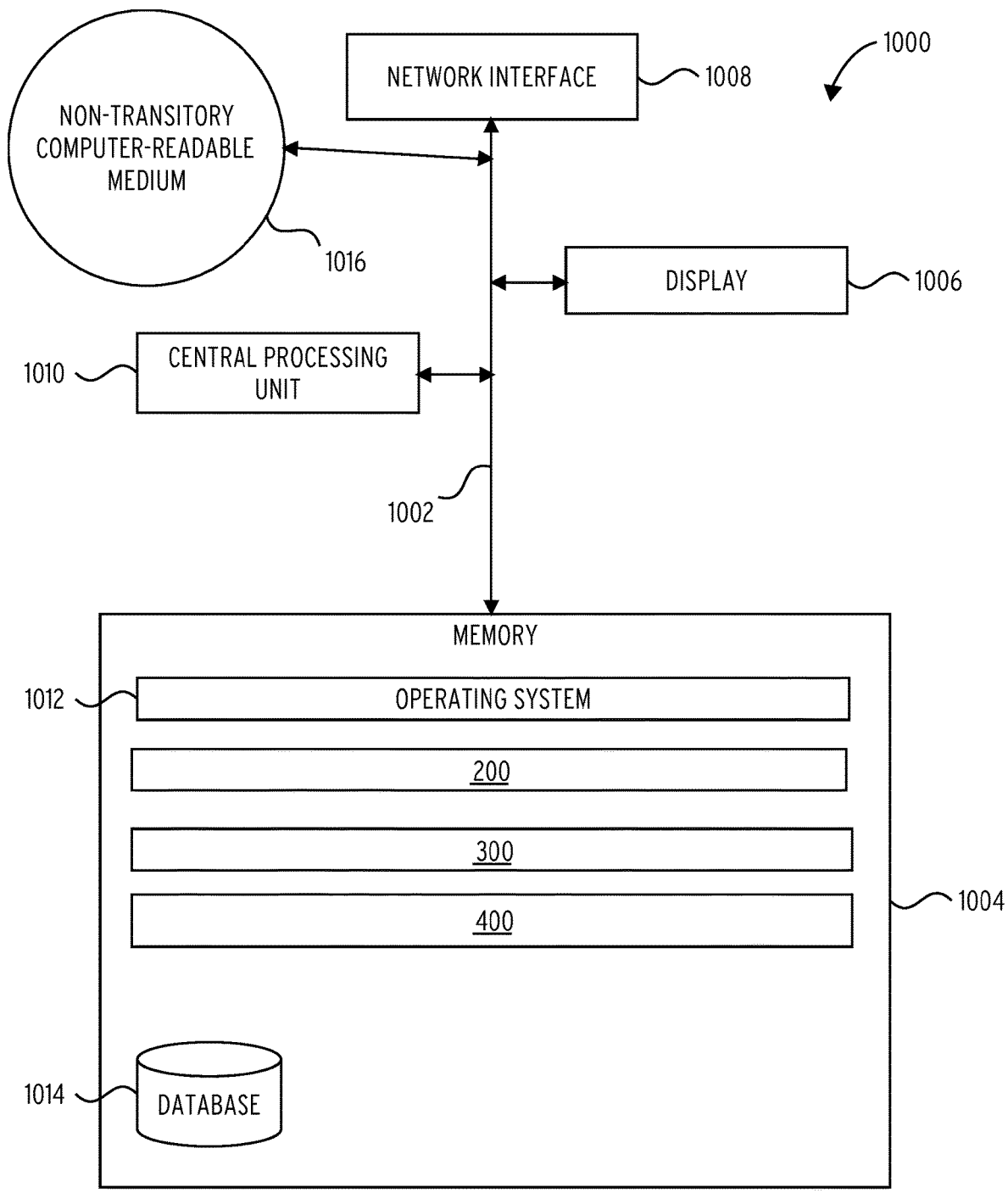
FIG. 10 illustrates a system 1000 in accordance with one embodiment.

FIG. 10 illustrates several components of an exemplary system 1000 in accordance with one embodiment. In various embodiments, system 1000 may include a desktop PC, server, workstation, mobile phone, laptop, tablet, set-top box, appliance, or other computing device that is capable of performing operations such as those described herein. In some embodiments, system 1000 may include many more components than those shown in FIG. 10. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, system 1000 may comprise one or more physical and/or logical devices that collectively provide the functionalities described herein. In some embodiments, system 1000 may comprise one or more replicated and/or distributed physical or logical devices.

In some embodiments, system 1000 may comprise one or more computing resources provisioned from a "cloud computing" provider, for example, Amazon Elastic Compute Cloud ("Amazon EC2"), provided by Amazon.com, Inc. of Seattle, Washington; Sun Cloud Compute Utility, provided by Sun Microsystems, Inc. of Santa Clara, California; Windows Azure, provided by Microsoft Corporation of Redmond, Washington, and the like.

System 1000 includes a bus 1002 interconnecting several components including a network interface 1008, a display 1006, a central processing unit 1010, and a memory 1004.

Memory 1004 generally comprises a random access memory ("RAM") and permanent non-transitory mass storage device, such as a hard disk drive or solid-state drive. Memory 1004 stores an operating system 1012 as well as routine 200, routine 300 and routine 400.

These and other software components may be loaded into memory 1004 of system 1000 using a drive mechanism (not shown) associated with a non-transitory computer-readable medium 1016, such as a floppy disc, tape, DVD/CD-ROM drive, memory card, or the like.

Memory 1004 also includes database 1014. In some embodiments, system 1000 may communicate with database 1014 via network interface 1008, a storage area network ("SAN"), a high-speed serial bus, and/or via the other suitable communication technology.

In some embodiments, database 1014 may comprise one or more storage resources provisioned from a "cloud storage" provider, for example, Amazon Simple Storage Service ("Amazon S3"), provided by Amazon.com, Inc. of Seattle, Washington, Google Cloud Storage, provided by Google, Inc. of Mountain View, California, and the like.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. "Logic" refers to machine memory circuits, non-transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter). Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation.

Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

Those skilled in the art will recognize that optical aspects of implementations may involve optically-oriented hardware, software, and or firmware. The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Embodiments of methods and systems for interpreting beam direction imaging data have been described. The following claims are directed to said embodiments, but do not preempt application performance testing in the abstract. Those having skill in the art will recognize numerous other approaches to interpreting beam direction imaging data possible and/or utilized commercially, precluding any possibility of preemption in the abstract. However, the claimed system improves, in one or more specific ways, the operation of a machine system for interpreting beam direction imaging data, and thus distinguishes from other approaches to the same problem/process in how its physical arrangement of a machine system determines the system's operation and ultimate effects on the material environment. The terms used in the appended claims are defined herein in the glossary section, with the proviso that the claim terms may be used in a different manner if so defined by express recitation.

What is claimed is:

1. A method of generating an image from a phased array, the method comprising:
    receiving signals from each of a plurality of sensors in a phased array, the plurality of sensors generating the signals in response to receiving an echo of transmitted ultrasound signals;
    for each of the received signals, pairing a signal received by a first sensor in the phased array with a signal received by a second sensor, located adjacent to the first sensor in the phased array, to form a first set of paired signals, each of the paired signals in the first set of paired signals having angular resolution information of an object;
    hierarchically combining paired signals to form additional sets of paired signals and determining refined angular resolution information of the additional sets of paired signals, wherein hierarchically combining paired signals includes forming a second set of paired signals by pairing each of the paired signals in the first set of paired signals with another of the paired signals in the first set of paired signals, the refined angular resolution information of each of the paired signals in the second set of paired signals determined from the angular information of resolution of each paired signal in the first set of paired signals used to form the corresponding second paired signals in the second set of paired signals;
    continuing to hierarchically combine paired signals until the refined angular information of resolution of the paired signals has been converted to angular information of resolution at an Abbe limit; and
    forming an image using the hierarchically combined paired signals.

2. The method of claim 1, wherein continuing to hierarchically combine paired signals comprises forming a third set of paired signals with refined angular resolution by pairing each paired signal in the second set of paired signals with another paired signal in the second set of paired signals, the refined angular information of resolution determined from the angular information of resolution of each paired signal in the second set of paired signals used to form the corresponding third paired signals in the third set of paired signals.

3. The method of claim 2, wherein continuing to hierarchically combine paired signals comprises forming a fourth set of paired signals with refined angular resolution by pairing each paired signal in the third set of paired signals with another paired signal in the third set of paired signals, the refined angular information of resolution determined from the angular information of resolution of each paired signal in the third set of paired signals used to form the corresponding fourth paired signals in the fourth set of paired signals.

4. The method of claim 1, further comprising apodizing the received signals from sensors in the phased array.

5. The method of claim 1, further comprising compensating for time delay of the received signals due to the location of each sensor in the phased array.

6. The method of claim 1, wherein each paired signal in the first set of paired signals is paired with another paired signal in the first set of paired signals in accordance with their spatial placement and angle in volume in the phased array.

7. The method of claim 6, wherein each paired signal in the second set of paired signals with another paired signal in the second set of paired signals in accordance with their spatial placement and angle in volume in the phase array.

8. The method of claim 1, wherein the second sensor is located above, below, or beside the first sensor.

9. The method of claim 1, wherein the echo of the transmitted ultrasound signals is near field imaging data.

10. The method of claim 1, wherein the echo of the transmitted ultrasound signals is far field imaging data.

11. The method of claim 1, further comprising transmitting the ultrasound signals.

12. The method of claim 11, wherein the transmitted ultrasound signals comprise a plurality of ultrasound frequencies.

13. The method of claim 1, wherein the plurality of sensors are less than a wavelength apart.

14. The method of claim 1, wherein the plurality of sensors are less than 0.7 wavelengths apart.

15. A beamforming apparatus comprising:
    a phased array comprising transducers separated by a distance L configured to receive signals of a frequency (f) with a period (T) and wherein there is a time delay of $+t/4$ to $-t/4$ between signals received by adjacent transducers;
    a processor configured to translate spatial input data to angular output by:
    pairing each received signal according to space and time to create a first set of paired received signals;
    pairing each of the first set of paired received signals according to space, angle and time to create a second set of paired signals;
    pairing each of the second set of paired signals according to space, angle and time to create a third set of paired signals;
    pairing each of the third set of paired signals according to space, angle and time to create a fourth set of paired signals;
    continuing hierarchically to combine angles of interest with adjacent angular beams from neighboring subarrays to refine angular resolution until all of the spatial input has been converted to angular information of resolution at an Abbe limit;
    apodizing each set of signals;
    interpolating the angular information; and
    forming an image from the interpolated angular information; and wherein, all possible beam directions are detected in parallel.

16. The beamforming apparatus of claim 15, wherein the distance L is $\lambda/1.44$.

17. The beamforming apparatus of claim 15, wherein a beam angle varies between $+\pi/4$ radians to $-\pi/4$ radians.

18. The beamforming apparatus of claim 15, wherein the beamforming apparatus is frequency agnostic.

* * * * *